(12) United States Patent
Singh et al.

(10) Patent No.: US 10,512,064 B1
(45) Date of Patent: Dec. 17, 2019

(54) ALLOCATING WIRELESS COMMUNICATION LINK RESOURCES IN A CONTROL CHANNEL

(71) Applicant: Sprint Spectrum LP, Overland Park, KS (US)

(72) Inventors: Jasinder P. Singh, Olathe, KS (US); Maulik K. Shah, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 498 days.

(21) Appl. No.: 13/938,164

(22) Filed: Jul. 9, 2013

(51) Int. Cl.
*H04W 72/04* (2009.01)

(52) U.S. Cl.
CPC .............................. *H04W 72/0413* (2013.01)

(58) Field of Classification Search
None
See application file for complete search history.

(56) References Cited

U.S. PATENT DOCUMENTS

| | | | |
|---|---|---|---|
| 8,879,447 B1* | 11/2014 | Makhlouf | H04W 72/0413 370/310.2 |
| 2008/0220806 A1* | 9/2008 | Shin | H04W 52/08 455/522 |
| 2009/0073922 A1* | 3/2009 | Malladi | H04L 1/0004 370/328 |
| 2009/0290549 A1 | 11/2009 | Tiirola et al. | |
| 2010/0074209 A1* | 3/2010 | Montojo | H04W 72/1231 370/329 |
| 2010/0142467 A1 | 6/2010 | Tiirola et al. | |
| 2010/0150085 A1* | 6/2010 | Ishii | H04W 72/04 370/329 |
| 2010/0220683 A1* | 9/2010 | Novak | H04L 5/0044 370/330 |
| 2011/0134892 A1* | 6/2011 | Shirakabe | H04W 72/10 370/336 |
| 2011/0188447 A1* | 8/2011 | Wang | H04L 5/0053 370/328 |
| 2011/0286407 A1* | 11/2011 | Vajapeyam | H04W 16/10 370/329 |
| 2012/0014251 A1* | 1/2012 | Arnott | H04L 5/0007 370/232 |
| 2012/0051315 A1* | 3/2012 | Wang | H04W 72/082 370/329 |
| 2012/0120888 A1* | 5/2012 | Miao | H04B 1/7143 370/329 |
| 2012/0147836 A1* | 6/2012 | Ishii | H04W 72/1268 370/329 |
| 2012/0243427 A1* | 9/2012 | Brisebois | H04W 72/085 370/252 |

(Continued)

*Primary Examiner* — Gregory B Sefcheck
*Assistant Examiner* — Suk Jin Kang

(57) ABSTRACT

An interference level is determined in an uplink portion of a wireless communication link between a wireless device and an access node. A traffic class of data is identified in a first portion of the uplink portion, and resource blocks in a second portion of the uplink portion are selected based on the determined interference level and the identified traffic class. The wireless device is sent an allocation of the selected resource blocks in the second portion of the uplink portion, and control channel information is received from the wireless device in the uplink portion in the selected resource blocks.

15 Claims, 8 Drawing Sheets

(56) References Cited

U.S. PATENT DOCUMENTS

| | | | | |
|---|---|---|---|---|
| 2012/0314569 A1* | 12/2012 | Liu | H04W 36/0094 | 370/230 |
| 2013/0040683 A1* | 2/2013 | Siomina | H04W 28/0236 | 455/517 |
| 2013/0114570 A1* | 5/2013 | Park | H04L 5/0053 | 370/335 |
| 2013/0121189 A1* | 5/2013 | Bhattad | H04W 72/082 | 370/252 |
| 2013/0229934 A1* | 9/2013 | Brisebois | H04W 72/085 | 370/252 |
| 2013/0230000 A1* | 9/2013 | Wang | H04L 5/0053 | 370/329 |
| 2013/0250895 A1* | 9/2013 | Malladi | H04L 1/0004 | 370/329 |
| 2013/0250918 A1* | 9/2013 | Liu | H04W 36/0094 | 370/332 |
| 2013/0301422 A1* | 11/2013 | Caretti | H04B 1/1027 | 370/241 |
| 2013/0301602 A1* | 11/2013 | Uchino | H04W 72/14 | 370/329 |
| 2013/0315182 A1* | 11/2013 | Kitou | H04W 72/1289 | 370/329 |
| 2013/0322331 A1* | 12/2013 | Ramkumar | H04W 28/10 | 370/328 |
| 2014/0098754 A1* | 4/2014 | Luo | H04L 5/0053 | 370/329 |
| 2014/0126525 A1* | 5/2014 | Shen | H04L 5/0053 | 370/329 |
| 2014/0161083 A1* | 6/2014 | Nobukiyo | H04W 72/042 | 370/329 |
| 2014/0194133 A1* | 7/2014 | Darwood | H04L 5/0041 | 455/450 |
| 2014/0219226 A1* | 8/2014 | Li | H04W 52/20 | 370/329 |
| 2014/0220988 A1* | 8/2014 | Miki | H04W 72/085 | 455/450 |
| 2014/0247790 A1* | 9/2014 | Vajapeyam | H04W 16/10 | 370/329 |
| 2014/0307552 A1* | 10/2014 | Elsherif | H04W 36/14 | 370/235 |
| 2014/0323173 A1* | 10/2014 | Shin | H04W 52/08 | 455/522 |
| 2014/0341175 A1* | 11/2014 | Beale | H04L 5/0007 | 370/330 |
| 2015/0063262 A1* | 3/2015 | Ji | H04L 5/0007 | 370/329 |
| 2015/0365941 A1* | 12/2015 | Liu | H04W 72/0446 | 370/280 |
| 2016/0135131 A1* | 5/2016 | Shin | H04W 52/08 | 455/522 |
| 2016/0242166 A1* | 8/2016 | Nam | H04L 5/001 | |

* cited by examiner

ALLOCATING WIRELESS COMMUNICATION LINK RESOURCES IN A CONTROL CHANNEL

TECHNICAL BACKGROUND

In a wireless communication system, a wireless device communicates with an access node using a wireless communication link. The physical layer of the wireless communications link, such as a frequency or frequencies, can comprise one or more logical channels. Communications from the access node to the wireless device are typically referred to as downlink communications, and communications from the wireless device to the access node are typically referred to as uplink communications. Each of the uplink and downlink communications can comprise one or more portions for bearer data, for example, related to voice or data communications, and one or more portions for non-bearer data. Examples of non-bearer data in downlink communications comprise initial cell access information, resource assignments for wireless devices, control and bearer data formatting information, bearer data ACK and NACK responses, and the like. Examples of non-bearer data in uplink communications comprise automatic retransmission request (ARQ) and hybrid automatic retransmission request (HARM) ACK and NACK messages, channel quality indicators (CQI), MIMO feedback (such as a rank indicator, a precoding matrix indicator, and the like) and scheduling requests for uplink transmission.

Overview

In operation, an interference level is determined in an uplink portion of a wireless communication link between a wireless device and an access node, and a traffic class of data is identified in a first portion of the uplink portion. Resource blocks in a second portion of the uplink portion are selected based on the determined interference level and the identified traffic class. The wireless device is sent an allocation of the selected resource blocks in the second portion of the uplink portion, and control channel information is received from the wireless device in the uplink portion in the selected resource blocks.

DETAILED DESCRIPTION

Figure 1:
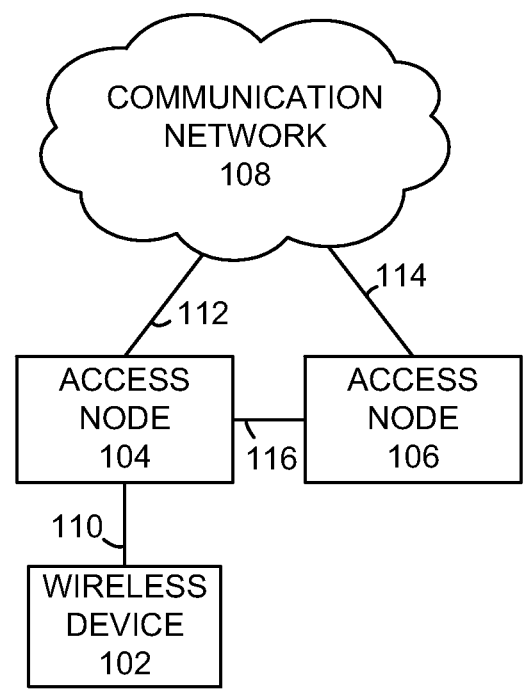
FIG. 1 illustrates an exemplary communication system to allocate wireless communication link resources in a control channel.

FIG. 1 illustrates an exemplary communication system 100 to allocate wireless communication link resources in a control channel comprising wireless device 102, access nodes 104 and 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 110. Communication link 110 can comprise an uplink portion for communications from wireless device 102 to access node 104, and a downlink portion for communications from access node 104 to wireless device 102.

Access nodes 104 and 106 are each a network node capable of providing wireless communications to a wireless device (such as wireless device 102), and can be, for example, a base transceiver station, a radio base station, an eNodeB device, or an enhanced eNodeB device. Access node 104 is in communication with communication network 108 over communication link 112, and access node 106 is in communication with communication network 108 over communication link 114. Access nodes 104 and 106 can also communicate with each other over communication link 116. Access nodes 104 and 106 can be neighboring access nodes, and can communication information about signal interference, wireless communication resource allocation, and the like with each other over communication link 116.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114 and 116 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106 and communication network 108 which are omitted for clarity, including additional processing nodes, routers, gateways, and physical and/or wireless data links for carrying data among the various network elements.

Wireless communication link 110 can comprise a downlink portion for communications from the access node to the wireless device and an uplink portion for communications from the wireless device to the access node. Each of the uplink and downlink communications can comprise one or more portions for bearer data, for example, related to voice or data communications, and one or more portions for non-bearer data.

Figure 2A:
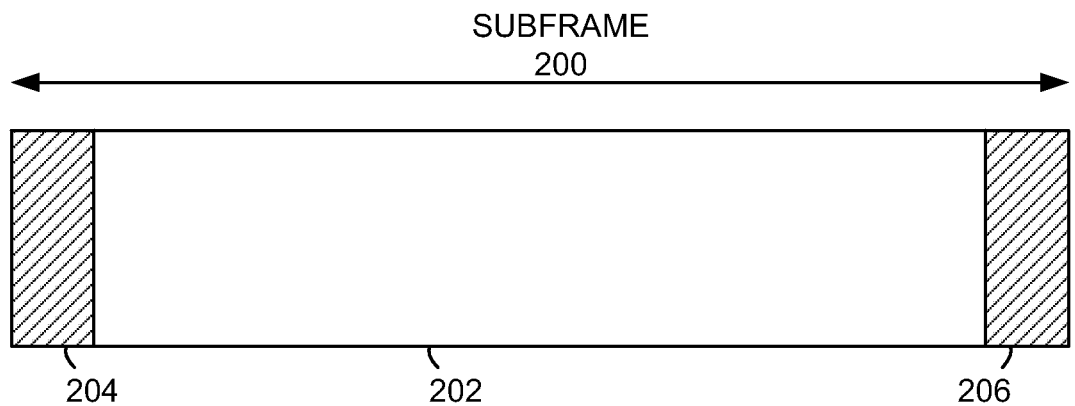
FIGS. 2A and 2B illustrate exemplary allocations of wireless communication link resources in a control channel.

In organizing the bearer data portions and the non-bearer data portions, for example, within a sub-frame of an uplink portion, conventionally a static allocation of resource blocks is used. In order to provide the largest contiguous group of resource blocks for bearer data, typically resource blocks are statically allocated at the edges of a sub-frame for the non-bearer data portions of the uplink. For example, FIG. 2A illustrates subframe 200 comprising bearer data portion 202 and non-bearer data portions 204 and 206. Each of bearer data portion 202 and non-bearer data portions 204 and 206 comprise resource blocks allocated to the respective portions. Non-bearer data portions 204 and 206 are positioned at the edges of subframe 200, and bearer data portion 202 comprises contiguous resource blocks to carry bearer data. Interference caused by other signals, and in particular by signals from other access nodes (for example, interference between signals from access nodes 104 and 106), is more likely to be experienced by resource blocks closer to a subframe edge.

Figure 2B:
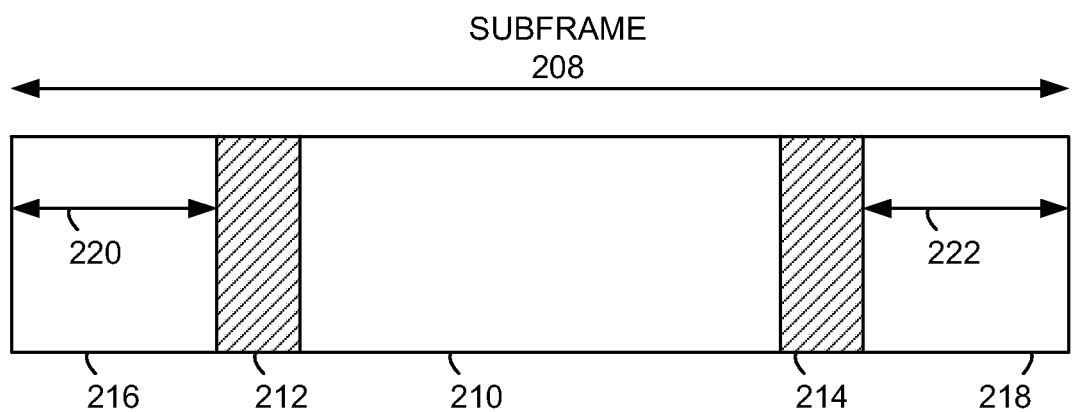

To mitigate uplink control channel interference, resource blocks can be allocated dynamically to non-bearer data portions of the uplink. In operation, an interference level is determined in an uplink portion of a communication link 108 between wireless device 102 and access node 104. Access node 104 can determine an interference level across the uplink portion of communication link 108. Next, a traffic class of data in a first portion of the uplink portion is identified. For example, access node 104 (or another network element of communication system 100) can determine a traffic class indicator of bearer data sent from wireless device 102 to access node 104. Based on the determined interference level and the identified traffic class, resource blocks are selected in a second portion of the uplink portion. For example, FIG. 2B illustrates subframe 208 comprising bearer data portion 210, non-bearer data portions 212 and 214, and bearer data portions 216 and 218. Resource blocks for non-bearer data portions 212 and 214 can be allocated based on the determined interference level in the uplink and on the identified traffic class of data from wireless device 102. Resource blocks for non-bearer data portions 212 and 214 can be selected away from the edges of the subframe. For example, distances from the subframe edge 220 and 222 can comprise resource blocks which are not selected for non-bearer data portions 212 and 214 and can be used for bearer data. Distances 220 and 222 (and the corresponding amount or number of resource blocks in those subframe regions) may vary depending on the resource blocks selected for non-bearer data portions 212 and 214. An allocation of the selected resource blocks in the second portion of the uplink portion is sent to the wireless device, and control channel information is received from wireless device 102 in the selected resource blocks.

Figure 3:
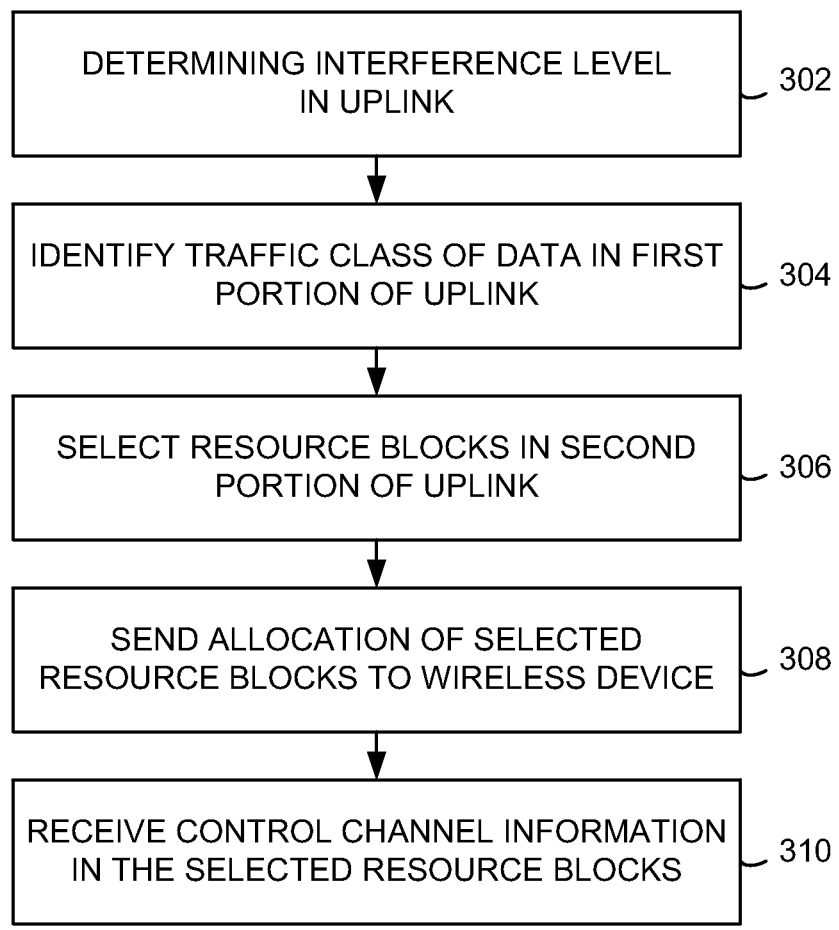
FIG. 3 illustrates an exemplary method of allocating wireless communication link resources in a control channel.

FIG. 3 illustrates an exemplary method of allocating wireless communication link resources in a control channel. An interference level is determined in an uplink portion of a wireless communication link between a wireless device and an access node (operation 302). For example, access node 104 can determine a level of interference in an uplink portion of wireless communication link 110. The interference experienced in the uplink can be caused by wireless communication signals from access node 106, such as uplink and/or downlink communications with another wireless device in communication with access node 106.

In operation 304, a traffic class of data in a first portion of the uplink portion is identified. A traffic class indicator can indicate a level of priority of data, and can further comprise an application requirement of an application running on a wireless device, which may require, for example, a minimum data rate, a minimum throughput, a maximum permitted data error rate, a maximum permitted packet loss rate, and the like. The traffic class indicator can also comprise a traffic class indicator associated with bearer data being sent from a wireless device, such as a quality of service class indicator (QCI) or similar traffic class indicator. The traffic class indicator can also comprise a level of priority provisioned within communication system 100 for a wireless device, such as may be associated with a premium-level subscriber, an emergency responder, and the like.

Resource blocks in a second portion of the uplink portion are selected based on the determined interference level and the identified traffic class (operation 306). For example, referring to FIG. 2B, resource blocks can be selected for non-bearer data portions 212 and 214 based on the determined interference level and the identified traffic class. Resource blocks for non-bearer data portions 212 and 214 can be selected away from the edges of the subframe. For example, distances from the subframe edge 220 and 222 can comprise resource blocks with are not selected for non-bearer data portions 212 and 214. Distances 220 and 222 (and the corresponding amount or number of resource blocks in those subframe regions) may vary depending on the resource blocks selected for non-bearer data portions 212 and 214. Non-bearer data portions 212 and 214 can be used for control channel information.

In an embodiment, first resource blocks and second resource blocks are selected for the non-bearer data portions based on the determined interference level and the identified traffic class. The first resource blocks can comprise a first region, and the second resource blocks can comprise a second region, of the second portion of the uplink portion of communication link 110. In an embodiment, the resource blocks of the first and second regions can be selected so as to be symmetrically located within subframe 208 relative to the first portion of the uplink portion (for example, first portion 210). Where the selection of resource blocks (and/or regions) creates regions of the first portion of the uplink, for example, bearer data portions 210, 216 and 218, the resource blocks of the first and second regions can be selected to as to be symmetrically located relative to bearer data portions 210, 216 and 218. Additionally, or alternatively, resource blocks can be selected for non-bearer data portions 212 and 214 so that distances 220 and 222 from subframe 208 edges are substantially equal.

Next, an allocation of the selected resource blocks in the second portion of the uplink portion is sent to the wireless device (operation 308). For example, the allocation can be sent to wireless device 102 from access node 104 in the downlink portion of communication link 110. A message comprising a system information block (SIB) or another message from access node 104 to wireless device 102 (for example, SIB2 or its functional equivalent) can be used to convey the allocation to wireless device 102. Using the allocation, control channel information can be received from the wireless device in the uplink portion in the selected resource blocks (operation 310). Examples of non-bearer data in uplink communications comprise automatic retransmission request (ARQ) and hybrid automatic retransmission request (HARM) ACK and NACK messages, channel quality indicators (CQI), MIMO feedback (such as a rank indicator, a precoding matrix indicator, and the like) and scheduling requests for uplink transmission.

Figure 4:
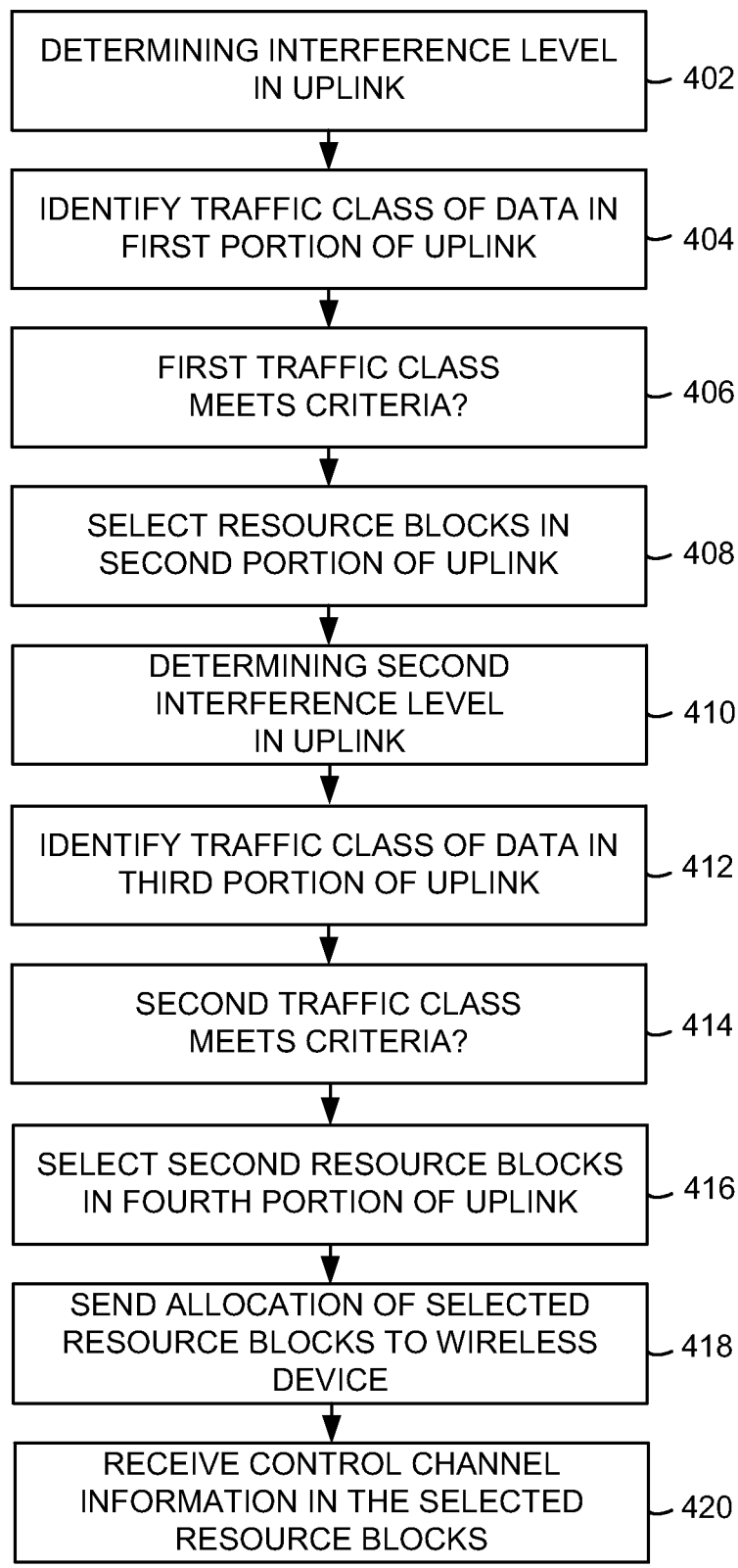
FIG. 4 illustrates another exemplary method of allocating wireless communication link resources in a control channel.

FIG. 4 illustrates another exemplary method of allocating wireless communication link resources in a control channel. An interference level is determined in an uplink portion of a wireless communication link between a wireless device and an access node (operation 402). For example, access node 104 can determine a level of interference in an uplink portion of wireless communication link 110. The interference experienced in the uplink can be caused by wireless communication signals from access node 106, such as uplink and/or downlink communications with other wireless device in communication with access node 106.

In operation 404, first a traffic class of data in a first portion of the uplink portion is identified. A traffic class indicator can indicate a level of priority of data, and can further comprise an application requirement of an application running on a wireless device, which may require, for example, a minimum data rate, a minimum throughput, a maximum permitted data error rate, a maximum permitted packet loss rate, and the like. The traffic class indicator can also comprise a traffic class indicator associated with bearer data being sent from a wireless device, such as a quality of service class indicator (QCI) or similar traffic class indicator. The traffic class indicator can also comprise a level of priority provisioned within communication system 100 for a wireless device, such as may be associated with a premium-level subscriber, an emergency responder, and the like. The first portion and the second portion may comprise a subframe of the uplink.

It is determined whether the first traffic class meets a first traffic class criteria (operation 406). The first traffic class criteria can comprise a level of QCI, an application requirement of an application running on a wireless device, a level of priority provisioned for a wireless device 102, and the like. When the first traffic class meets the first traffic class criteria, resource blocks are selected in a second portion of the uplink portion based on the determined interference level (operation 408). The first traffic class criteria can be met when the first traffic class is greater than or equal to a traffic class threshold.

Resource blocks in a second portion of the uplink portion are selected based on the determined interference level and the identified traffic class (operation 306). For example, referring to FIG. 2B, resource blocks can be selected for non-bearer data portions 212 and 214 based on the determined interference level and the identified traffic class. Resource blocks for non-bearer data portions 212 and 214 can be selected away from the edges of the subframe. For example, distances 220 and 222 from the subframe edges can comprise resource blocks with are not selected for non-bearer data portions 212 and 214. Distances 220 and 222 (and the corresponding amount or number of resource blocks in those subframe regions) may vary depending on the resource blocks selected for non-bearer data portions 212 and 214.

In operation 410, a second interference level is determined in an uplink portion of the wireless communication link between the wireless device and the access node. For example, access node 104 can determine a second level of interference in an uplink portion of wireless communication link 110. A second traffic class of data in a third portion of the uplink portion is identified (operation 412). The second traffic class indicator can indicate a level of priority of data, and can further comprise an application requirement of an application running on a wireless device, a quality of service class indicator (QCI) or similar traffic class indicator, or a level of priority provisioned within communication system 100 for the wireless device.

It is determined whether the second traffic class meets a second traffic class criteria (operation 414). The second traffic class criteria can comprise a level of QCI, an application requirement of an application running on a wireless device, a level of priority provisioned for a wireless device 102, and the like. The second traffic class criteria can be met when the second traffic class is less than a traffic class threshold. When the second traffic class meets the second traffic class criteria, second resource blocks are selected in a fourth portion of the uplink portion based on the determined interference level (operation 416). The third portion and the fourth portion can comprise a second subframe of the uplink, and can be analogous to bearer data portions and non-bearer data portions described above.

Resource blocks in the fourth portion of the uplink portion can be selected away from the edges of the subframe, or at the edges of the subframe, based on the determined interference level. The location of the resource blocks of the fourth portion of the uplink can be a different distance from the subframe edges than the location of the resource blocks of the second portion of the uplink. Thus, the resource blocks selected for the second portion and the resource blocks selected for the fourth portion (and resource blocks selected for subsequent non-bearer data portions of the uplink) can be located at varying distances from their respective subframe edges, based on the determined interference level in the uplink, which may vary over time. Further, the locations of the resource blocks selected can vary based on the respective traffic class criteria of the bearer data in each subframe.

In an embodiment, the first criteria can comprise a relatively high traffic class indicator, and the second criteria can comprise a relatively low traffic class indicator. For example, the first criteria can be a relatively high QCI, a relatively high minimum data rate, a relatively high minimum throughput, a relatively low maximum permitted data error rate, a relatively low maximum permitted packet loss rate, and the like, and the second criteria can comprise a comparatively low QCI, a relatively low minimum data rate, a relatively low minimum throughput, a relatively high maximum permitted data error rate, a relatively high maximum permitted packet loss rate, and the like. The locations of non-bearer data portions in subframes can vary based on the respective interference level and/or the traffic class identifier of each subframe. The location of the non-bearer data portions in a subframe can be at the subframe edge, according to the interference level and/or the traffic class identifier of the subframe.

An allocation of the selected resource blocks in the second portion and in the fourth portion of the uplink portion is sent to the wireless device (operation 418). For example, the allocation can be sent to wireless device 102 from access node 104 in the downlink portion of communication link 110. A message comprising a system information block (SIB) or another message from access node 104 to wireless device 102 (for example, SIB2 or its functional equivalent) can be used to convey the allocation to wireless device 102. Using the allocation, control channel information can be received from the wireless device in the uplink portion in the selected resource blocks (operation 420). Examples of non-bearer data in uplink communications comprise automatic retransmission request (ARQ) and hybrid automatic retransmission request (HARM) ACK and NACK messages, channel quality indicators (CQI), MIMO feedback (such as a rank indicator, a precoding matrix indicator, and the like) and scheduling requests for uplink transmission.

Figure 5:
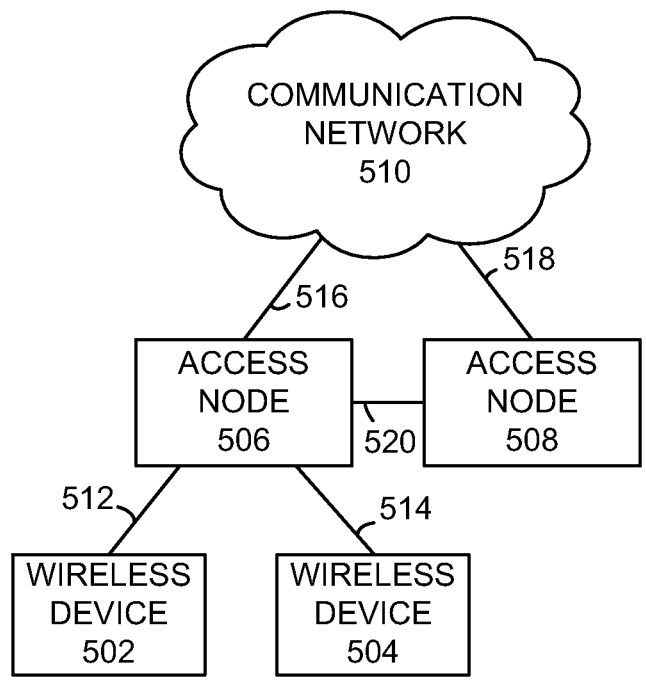
FIG. 5 illustrates another exemplary system to allocate wireless communication link resources in a control channel.

FIG. 5 illustrates another exemplary system 500 to allocate wireless communication link resources in a control channel comprising wireless devices 502 and 504, access nodes 506 and 508, and communication network 510. Examples of wireless devices 502 and 504 can comprise a cell phone, a smart phone, a computing platform such as a laptop, palmtop, or tablet, a personal digital assistant, or an internet access device, including combinations thereof. Wireless device 502 is in communication with access node 506 over communication link 512, and wireless device 504 and communicate with access node 506 over communication link 514. Communication links 512 and 514 can each comprise an uplink portion and a downlink portion.

Access nodes 504 and 506 are each a network node capable of providing wireless communications to a wireless device (such as wireless devices 502 and 504), and can be, for example, a base transceiver station, a radio base station, an eNodeB device, or an enhanced eNodeB device. Access node 506 is in communication with communication network 510 over communication link 516, and access node 508 is in communication with communication network 510 over communication link 518. Access nodes 506 and 508 can also communicate with each other over communication link 520. Access nodes 506 and 508 can be neighboring access nodes, and can communication information about signal interference, wireless communication resource allocation, and the like with each other over communication link 520.

Communication network 510 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 can be capable of carrying voice information and other data, for example, to support communications by a wireless device such as wireless devices 502 and 504. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 510 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 510 may also comprise a wireless network, including base stations, wireless communication nodes, telephony switches, internet routers, network gateways, computer systems, communication links, or some other type of communication equipment, and combinations thereof.

Communication links 512, 514, 516, 518 and 520 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 506, access node 508 and communication network 510 which are omitted for clarity, including additional processing nodes, routers, gateways, and physical and/or wireless data links for carrying data among the various network elements.

Figure 6:
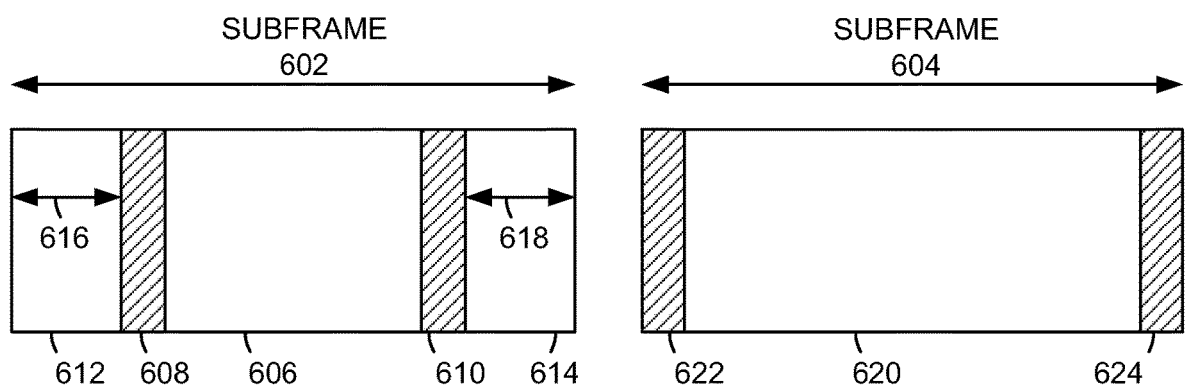
FIG. 6 illustrates another exemplary allocation of wireless communication link resources in a control channel.

Wireless communication links 512 and 514 can comprise a downlink portion for communications from the access node to the wireless device and an uplink portion for communications from the wireless device to the access node. Each of the uplink and downlink communications can comprise one or more portions for bearer data, for example, related to voice or data communications, and one or more portions for non-bearer data. For example, FIG. 6 illustrates subframes 602 and 604. Subframes 602 and 604 can be received at access node 506 from wireless devices 502 and 504, respectively. Subframe 602 comprises bearer data portions 606, 612 and 614 and non-bearer data portions 608 and 610. Each of bearer data portions 606, 612 and 614 and non-bearer data portions 608 and 610 comprise resource blocks allocated to the respective portions.

Resource blocks for non-bearer data portions 612 and 614 can be selected away from the edges of the subframe. For example, distances from the subframe edge 616 and 618 can comprise resource blocks with are not selected for non-bearer data portions 608 and 610. Distances 616 and 618 (and the corresponding amount or number of resource blocks in those subframe regions) may vary depending on the resource blocks selected for non-bearer data portions 608 and 610.

Subframe 604 comprises bearer data portion 620 and non-bearer data portions 622 and 624. Each of bearer data portion 620 and non-bearer data portions 622 and 624 comprise resource blocks allocated to the respective portions. Non-bearer data portions 622 and 624 are positioned at the edges of subframe 604, and bearer data portion 620 comprises contiguous resource blocks to carry bearer data.

Figure 7:
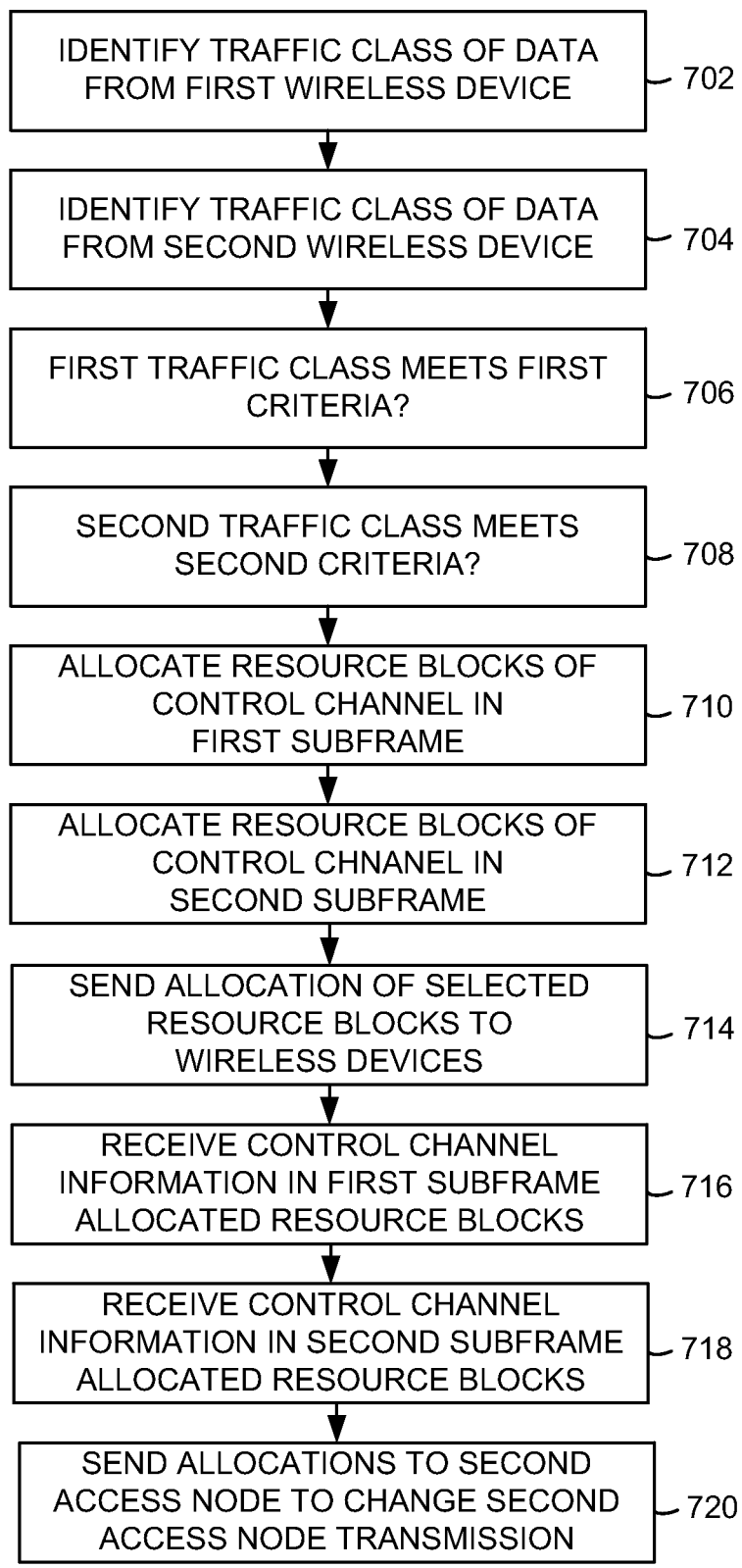
FIG. 7 illustrates another exemplary method of allocating wireless communication link resources in a control channel.

FIG. 7 illustrates another exemplary method of allocating wireless communication link resources in a control channel. A first traffic class of data received from a first wireless device at an access node is identified (operation 702), and a second traffic class of data received from a second wireless device at the access node is identified (operation 704). For example, a traffic class of data can be determined for each of wireless devices 502 and 504 in communication with access node 506. The traffic class indicator can be determined for bearer data received from each of wireless devices 502 and 504, and can indicate a level of priority of data, an application requirement of an application running on a wireless device, a quality of service class indicator or similar traffic class indicator, a level of priority provisioned within communication system 500 for a wireless device, and the like.

It is determined whether the first traffic class meets a first traffic class criteria (operation 706), and it is also determined whether the second traffic class meets a second traffic class criteria (operation 708). The first traffic class criteria and the second traffic class criteria can comprise a level of QCI, an application requirement of an application running on a wireless device, a level of priority provisioned for a wireless device 102, and the like.

When the first traffic class meets the first traffic class criteria, resource blocks of a control channel are allocated in the first subframe accordingly (operation 710). The first traffic class criteria can be met when the first traffic class is greater than or equal to a traffic class threshold. For example, bearer data from wireless device 502 can be associated with a relatively high QCI, indicating that the bearer data comprises a high routing priority and/or is associated with an application running on wireless device 502 which comprises a relatively high minimum data rate, a relatively high minimum throughput, a relatively low maximum permitted data error rate, a relatively low maximum permitted packet loss rate, and the like. Examples of an application associated with a relatively high QCI can include a voice over internet protocol (VoIP) application, a streaming video application, a streaming audio application, and other similar applications, including combinations thereof. When the first traffic class meets the first traffic class criteria, resource blocks of a control channel are allocated in the first subframe at a distance from the subframe edge, such as distances 616 and 618 (FIG. 6).

When the second traffic class meets the second traffic class meets the second traffic class criteria, resource blocks of a control channel are allocated in the second subframe accordingly (operation 712). The second traffic class criteria can comprise a level of QCI, an application requirement of an application running on a wireless device, a level of priority provisioned for a wireless device 504, and the like. The second traffic class criteria can be met when the second traffic class is less than a traffic class threshold. For example, bearer data from wireless device 504 can be associated with a relatively low QCI, indicating that the bearer data comprises a low routing priority and/or is associated with an application running on wireless device 504 which comprises a relatively low minimum data rate, a relatively low minimum throughput, a relatively high maximum permitted data error rate, a relatively high maximum permitted packet loss rate, and the like. Examples of an application associated with a relatively low QCI can include an email application, a text messaging application, an Internet browser, and other similar applications, including combinations thereof. When the second traffic class meets the second traffic class criteria, resource blocks of a control channel are allocated in the second subframe at the subframe edges, such as non-bearer data portions 622 and 624 illustrated in subframe 604 (FIG. 6).

The allocation of resource blocks away from the edges of the subframe requires additional computational resources and additional processing time as compared to statically allocating resource blocks at the subframe edges (or at another statically allocated location) in every subframe. One way to mitigate the additional processing overhead incurred by determining non-edge resource blocks for the control channel is by allocating non-edge resource blocks for those wireless devices which comprise a traffic class identifier which meets a threshold, for example, indicating that bearer data from the wireless device is associated with a relatively high traffic class indicator.

In operation 714, the allocations of the resource blocks of the control channel of the first subframe and the second subframe are sent to the first wireless device and the second wireless device, respectively. For example, access node 506 can send wireless devices 502 and 504 their respective allocations of resource blocks for their respective uplink control channels. Subsequently, control channel information can be received from the first wireless device in the allocated resource blocks of the control channel of the first subframe (operation 716), and control channel information can be received from the second wireless device in the allocated resource blocks of the control channel of the second subframe (operation 718).

In addition, the allocations of resource blocks for the control channels of the first and second subframes can be sent to a second access node (operation 720). For example, access node 506 can send to neighboring access node 508 the allocations of resource blocks for the control channels of the first and second subframes over communication link 520. When access node 508 receives the control channel allocations, access node 508 can change its transmission of information. For example, access node 508 can transmit a signal a signal at a lower power when at least one of the control channels of the first and second subframes is received. Additionally, or alternatively, access node 508 can determine to transmit no signal (i.e., not transmit) during the time when at least one of the control channels of the first and second subframes is received at access node 506 from wireless device 502 and 504 respectively.

Figure 8:
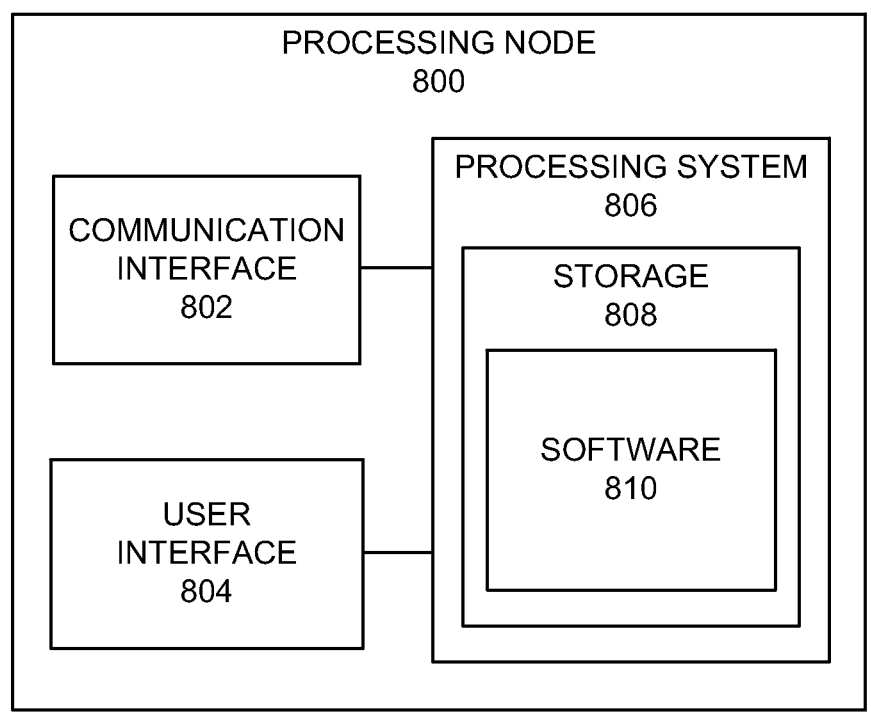
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to allocate wireless communication link resources in a control channel. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include access node 104 and access node 506. Processing node 800 can also be an adjunct or component of a network element, such as an element of access node 104 or access node 506. Processing node 800 can also be another network element in a communication system. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of allocating wireless communication link resources in a control channel, comprising:
   receiving, from a wireless device, control information in a control channel of an uplink portion of a wireless communication link between the wireless device and an access node;
   determining a first interference level in the uplink portion;
   identifying a first traffic class of data in a first portion of the uplink portion that carries bearer data;
   dynamically selecting adjusted resource blocks for channel control information in a second portion of the uplink portion that carries non-bearer data based on the identified first traffic class and the determined first interference level when the identified first traffic class meets a first traffic class criteria, wherein the first interference level is determined for the second portion of the uplink portion, and the adjusted resource blocks are a distance away from an edge of a subframe comprising the uplink portion, the distance varying depending on the adjusted resource blocks selected for the second portion that carries non-bearer data;
   sending to the wireless device an allocation of the adjusted resource blocks in the second portion of the uplink portion;
   receiving, from the wireless device, control channel information in the uplink portion in the adjusted resource blocks;
   determining at a second time a second interference level in the uplink portion of the wireless communication link;
   identifying at the second time a second traffic class of data in a third portion of the uplink portion;
   dynamically selecting adjusted second resource blocks in a fourth portion of the uplink portion based on the identified second traffic class and the determined second interference level when the identified second traffic class meets a second traffic class criteria, wherein the second interference level is determined for the fourth portion of the uplink portion;
   sending to the wireless device a second allocation of the adjusted second resource blocks; and
   receiving, from the wireless device, control channel information in the uplink portion in the adjusted second resource blocks.

2. The method of claim 1, wherein,
   the first interference level further comprises interference experienced by the second portion of the uplink portion from a signal of a second access node.

3. The method of claim 2, wherein the first interference level further comprises interference experienced by the non-bearer data carried in the second portion of the uplink portion, where the non-bearer data comprises one or more of an ACK or NACK message, a channel quality indicator (CQI) report, multiple input multiple output (MIMO) feedback, and a scheduling requests for an uplink transmission.

4. The method of claim 1, wherein dynamically selecting adjusted resource blocks further comprises selecting first resource blocks and second resource blocks in the second portion of the uplink portion based on the determined first interference level and the identified traffic class.

5. The method of claim 4, wherein the first resource blocks comprise a first region and the second resource blocks comprise a second region, and the first and second regions are symmetrical relative to the first portion of the uplink portion.

6. The method of claim 1, wherein identifying a traffic class of data further comprises determining a traffic class indicator associated with the data in the first portion of the uplink portion.

7. The method of claim 6, wherein the traffic class indicator further comprises a quality of service (QoS) class indicator.

8. The method of claim 1, wherein the first traffic class criteria is met when the first traffic class is greater than or equal to a traffic class threshold, and wherein the second traffic class criteria is met when the second traffic class is less than a traffic class threshold.

9. A method of allocating wireless communication link resources in a control channel, comprising:
   receiving, from a first wireless device, control information in a first control channel of an uplink portion of a wireless communication link between the first wireless device and an access node;
   identifying a first traffic class of uplink data received from the first wireless device at the access node, and a second traffic class of uplink data received from a second wireless device at the access node;
   determining that the first traffic class meets a first criteria, and that the second traffic class meets a second criteria;
   dynamically allocating adjusted resource blocks for the first control channel in a first subframe used by the first wireless device, wherein the adjusted resource blocks are a distance away from an edge of a subframe comprising the uplink portion, the distance being based on the first traffic class;

dynamically allocating resource blocks for a second control channel in a second subframe used by the second wireless device, wherein based on the second traffic class the allocated resource blocks are located at an edge of the second subframe;

sending the allocation of the adjusted resource blocks for the first control channel of the first subframe to the first wireless device, sending the allocation of the resource blocks for the second control channel of the second subframe to the second wireless device; and receiving, from the first wireless device, control channel information in the allocated adjusted resource blocks for the first control channel, and receiving, from the second wireless device, control channel information in the allocated resource blocks for the second control channel.

10. The method of claim 9, wherein the first subframe comprises resource blocks allocated for a bearer data portion and the adjusted resource blocks allocated for the first control channel.

11. The method of claim 10, wherein the allocated adjusted resource blocks in the first subframe are symmetrical relative to the bearer data portion of the first subframe.

12. The method of claim 9, wherein the allocated adjusted resource blocks of the first control channel in the first subframe further comprise a first region and a second region, and the first and second regions are symmetrical relative to a bearer data portion of the first subframe.

13. The method of claim 9, further comprising:

sending the allocation of the resource blocks of the first and second control channels of the first and second subframes to a second access node, changing a transmission from the second access node based on the allocation of resource blocks to at least one of the first and second subframes.

14. The method of claim 13, wherein changing a transmission from the second access node further comprises at least one of transmitting from the second access node a signal at a lower power when at least one of the first and second control channels of the first and second subframes is received, and transmitting from the second access node no signal when at least one of the first and second control channels of the first and second subframes is received.

15. A method of allocating wireless communication link resources in a control channel, comprising:

receiving, from a first wireless device, control information in a first control channel of an uplink portion of a wireless communication link between the first wireless device and an access node;

identifying a first traffic class of uplink data received from the first wireless device at the access node, and a second traffic class of uplink data received from a second wireless device at the access node;

determining that the first traffic class meets a first criteria, and that the second traffic class meets a second criteria, wherein the first criteria is met when the first traffic class is greater than or equal to a traffic class threshold, and wherein the second criteria is met when the second traffic class is less than a traffic class threshold;

dynamically allocating adjusted resource blocks for the first control channel in a first subframe used by the first wireless device, wherein based on the first traffic class the adjusted resource blocks are not located at an edge of the first subframe;

dynamically allocating resource blocks for a second control channel in a second subframe used by the second wireless device, wherein based on the second traffic class the allocated resource blocks are located at an edge of the second subframe;

sending the allocation of the adjusted resource blocks for the first control channel of the first subframe to the first wireless device, sending the allocation of the resource blocks for the second control channel of the second subframe to the second wireless device; and receiving, from the first wireless device, control channel information in the allocated adjusted resource blocks for the first control channel, and receiving, from the second wireless device, control channel information in the allocated resource blocks for the second control channel.

* * * * *